March 3, 1931. E. McGLOTHLEN 1,794,722
CULTIVATOR SHOVEL
Filed March 18, 1930
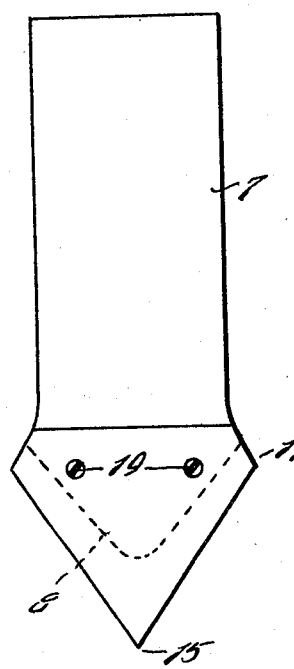
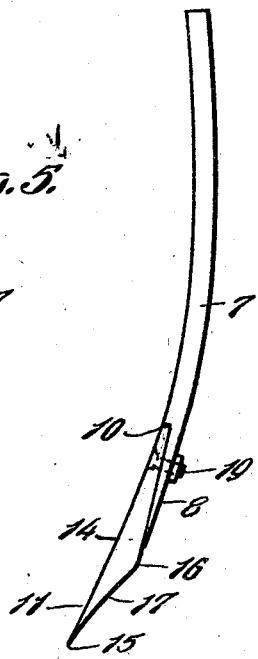
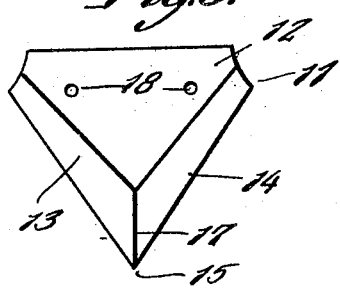
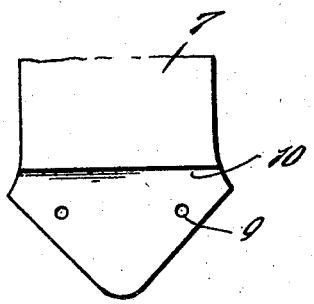
Inventor
Edward McGlothlen,
By Clarence A. O'Brien
Attorney Patented Mar. 3, 1931

1,794,722

UNITED STATES PATENT OFFICE

EDWARD McGLOTHLEN, OF CHICAGO, ILLINOIS

CULTIVATOR SHOVEL

Application filed March 18, 1930. Serial No. 436,803.

This invention relates to new and improved refinements in the construction of cultivator shovels.

An object of the invention is to construct a cultivator shovel in detachable sections so that the renewable and removable point of the shovel when rendered substantially useless from wear, or because of breakage, can be removed and a new one substituted therefor in a few minutes.

Another object of the invention is to so construct a cultivator shovel of two sections that when secured by the retaining means, the point of the structure cannot become accidently loosened.

A further object is to provide a composite sectional shovel structure wherein the shank has a peculiarly shaped extension or tang which is especially designed to cooperate with a removable point having a correspondingly shaped body portion and a suitably fashioned cutting edge.

In the drawings:

Figure 1 is a front elevation of the complete shovel structure.

Figure 2 is a side or edge view of Figure 1.

Figure 3 is a detail bottom plan view (or rear elevation) of the detachable point.

Figure 4 is a view showing the shouldered and tang equipped end construction of the shovel.

Figure 5 is a central vertical section through the structure shown in Figure 4.

Figure 6 is a central vertical section through the point shown in Figure 3.

Referring to the drawings in detail, it will be seen that the longitudinally bowed or curvate shank portion of the shovel is indicated by the numeral 7. In accordance with the present invention this includes a triangular end extension 8 at its bottom provided with bolt holes 9 and of the edged configuration shown in Figure 2. The edged configuration is such that this tang 8 is of tapered design, that is, tapering toward the apex portion. In fact the portion joining the body part of the shank is such as to define a transverse shoulder as at 10.

The blade or point is generally represented by the numeral 11. This is of high speed steel of a character which will well fulfill the requirements of a product of this type. The body portion 12 is of triangular configuration and conforms in general outline and area to the correspondingly shaped tang 8. The marginal portions 13 are grooved and bevelled to form the primary cutting edges. The point 15 is inclined in a forward and downward direction from the apex portion 16 of the body 12. The apex 16 is disposed in close proximity to the corresponding portion of the triangular tang 8 as shown in Figure 2.

The point 15 defines a rib as at 17. The combined thickness of the tapered triangular parts 8 and 12 is equal to the thickness of the shank 7 thus forming a continuation of the shank which is free of obstruction and crevices for the accumulation of mud and dirt. The portion 12 is provided with bolt holes 18 which match the bolt holes 9 and serve to accommodate the removable bolts 19. Thus, the point is rigidly and detachably mounted on the tapered triangular tang 8 and firmly abuts the shoulder 10.

It will be observed that the tang 8 is of such an area that it does not interfere with the relatively wide cutting edges 13 and 14 or the undermining rib 17.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

As a new product of manufacture, a shovel comprising a substantially rectangular longitudinally bowed shank portion terminating in a substantially triangular tapered tang, said tang serving to define a retaining shoulder, a removable point detachably bolted on said tang and including a body portion of triangular configuration corresponding to the shape of the tang, and a marginal cutting edge, said cutting edge being of general V-shaped configuration, the apices of the tang and the triangular body portion of the point being disposed in close proximity and in substantially matched relationship, the cutting edges of the point projecting beyond the marginal edges of the tang, and the juncture of the cutting edges defining a forwardly and downwardly inclined rib whose inner end extends from the matched apices to the terminal end of said point.

In testimony whereof I affix my signature.

EDWARD McGLOTHLEN.